United States Patent
Kim et al.

(10) Patent No.: US 12,078,729 B2
(45) Date of Patent: Sep. 3, 2024

(54) METHOD FOR OBTAINING DEPTH INFORMATION, AND CAMERA MODULE

(71) Applicant: LG INNOTEK CO., LTD., Seoul (KR)

(72) Inventors: Eun Song Kim, Seoul (KR); Hyeong Jin Kim, Seoul (KR); Ju Un Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 150 days.

(21) Appl. No.: 17/277,157

(22) PCT Filed: Oct. 7, 2019

(86) PCT No.: PCT/KR2019/013133
§ 371 (c)(1),
(2) Date: Mar. 17, 2021

(87) PCT Pub. No.: WO2020/071883
PCT Pub. Date: Apr. 9, 2020

(65) Prior Publication Data
US 2021/0373163 A1  Dec. 2, 2021

(30) Foreign Application Priority Data
Oct. 5, 2018  (KR) .................. 10-2018-0119341

(51) Int. Cl.
| | |
|---|---|
| *H04N 5/225* | (2006.01) |
| *G01S 17/894* | (2020.01) |
| *G06T 3/4053* | (2024.01) |
| *H04N 23/56* | (2023.01) |
| *H04N 23/951* | (2023.01) |

(52) U.S. Cl.
CPC .......... *G01S 17/894* (2020.01); *G06T 3/4053* (2013.01); *H04N 23/56* (2023.01); *H04N 23/951* (2023.01)

(58) Field of Classification Search
CPC ... G01S 17/894; G06T 3/4053; H04N 5/2256; H04N 5/23232
See application file for complete search history.

(56) References Cited

U.S. PATENT DOCUMENTS

| | | | |
|---|---|---|---|
| 7,961,970 B1 | 6/2011 | Georgiev | |
| 2012/0169848 A1* | 7/2012 | Bae ...................... | H04N 13/254 348/222.1 |
| 2012/0242975 A1* | 9/2012 | Min ...................... | G01S 17/894 356/5.03 |

(Continued)

FOREIGN PATENT DOCUMENTS

| | | |
|---|---|---|
| CN | 104104941 A | 10/2014 |
| EP | 2 733 928 A2 | 5/2014 |

(Continued)

*Primary Examiner* — Jonathan R Messmore
(74) *Attorney, Agent, or Firm* — Birch, Stewart, Kolasch & Birch, LLP

(57) ABSTRACT

According to one embodiment, disclosed is a method for obtaining a depth image for an object, by using light obtained during a first period and a second period in a camera module capable of obtaining depth information. The camera module can obtain the depth image for the object by using the light obtained in a first reception pixel and a second reception pixel during the first period and the second period.

19 Claims, 14 Drawing Sheets

(56) References Cited

U.S. PATENT DOCUMENTS

| | | |
|---|---|---|
| 2013/0011046 A1 | 1/2013 | Choi et al. |
| 2014/0183338 A1* | 7/2014 | Fossum ................. G01S 7/4914 250/214.1 |
| 2014/0307057 A1* | 10/2014 | Kang ................... H04N 5/2256 348/47 |
| 2015/0130904 A1 | 5/2015 | Bae et al. |
| 2015/0302570 A1 | 10/2015 | Shirakyan et al. |
| 2016/0198147 A1 | 7/2016 | Waligorski et al. |
| 2016/0290790 A1 | 10/2016 | Wu |
| 2016/0306045 A1 | 10/2016 | Van Der Tempel et al. |
| 2016/0330814 A1* | 11/2016 | Rutgers ................ H05B 45/397 |
| 2018/0031755 A1 | 2/2018 | Ye et al. |
| 2018/0037155 A1* | 2/2018 | Danowski ............ B60Q 1/2696 |
| 2018/0143007 A1* | 5/2018 | Wu ....................... G01S 7/4914 |
| 2018/0156894 A1* | 6/2018 | Cardei .................... G06T 15/20 |
| 2018/0259647 A1 | 9/2018 | Takano et al. |
| 2018/0302542 A1* | 10/2018 | Masumura ........ G02F 1/136277 |

FOREIGN PATENT DOCUMENTS

| | | |
|---|---|---|
| EP | 3 193 190 A1 | 7/2017 |
| JP | 2009-79987 A | 4/2009 |
| JP | 2018-513366 A | 5/2018 |
| JP | 2018-522203 A | 8/2018 |
| KR | 10-2013-0006246 A | 1/2013 |
| KR | 10-2016-0148596 A | 12/2016 |
| KR | 10-2017-0121241 A | 11/2017 |
| WO | WO 2017/085916 A1 | 5/2017 |

\* cited by examiner (제 1 주기)　　　(제 2 주기)

METHOD FOR OBTAINING DEPTH INFORMATION, AND CAMERA MODULE

CROSS REFERENCE TO RELATED APPLICATIONS

This application is the National Phase of PCT International Application No. PCT/KR2019/013133, filed on Oct. 7, 2019, which claims priority under 35 U.S.C. 119(a) to Patent Application No. 10-2018-0119341, filed in the Republic of Korea on Oct. 5, 2018, all of which are hereby expressly incorporated by reference into the present application.

TECHNICAL FIELD

The present disclosure relates to a method and a camera module for obtaining depth information.

BACKGROUND ART

Devices that obtain information by outputting and reflecting light to and from an object have been used in various fields. For example, from 3D cameras to distance measurement techniques, technologies for obtaining information by outputting light are being used in several ways.

For example, time of flight (ToF) is a term representing the principle of measuring the distance by measuring the time difference between the time when the light is outputted and the time of reception of the received light reflected and returned from an object, and since implementation method of TOF technology is simple, it is used in various fields such as aviation, shipbuilding, civil engineering, cameras, surveying, and the like.

In addition, in this regard, the need for a camera that has better performance compared to hardware is increasing.

DETAILED DESCRIPTION OF THE INVENTION

Technical Subject

The present disclosure may provide a method for obtaining depth information and a camera module according to one or more embodiments. According to an embodiment, a method for obtaining a depth image of an object by using light obtained during a first period and a second period in a camera module capable of obtaining depth information is disclosed. The camera module may obtain a depth image of an object by using the light obtained during the first and second periods from the first and second reception pixels. The technical problem to be solved is not limited to the technical problems as described above, and various technical problems may be further included within a scope that is obvious to a person skilled in the art.

Technical Solution

The camera module according to the first aspect comprises: a light source for outputting light to an object; a receiver for receiving light reflected from the object through reception pixels; and a processor that obtains depth information on the object by using the phase difference between the light outputted from the light source and the light received by the receiver, wherein the reception pixels include a first reception pixel and a second reception pixel, wherein the first reception pixel receives light at a first phase time point in a first period and a second phase time point in a second period, respectively, and the second reception pixel receives light at a third phase time point of a first period and a fourth phase time point of a second period, respectively, and wherein the processor may obtain a depth image of the object by using information obtained during the first period and the second period.

In addition, the first phase time point to fourth phase time point may correspond to one of 0 degree, 90 degrees, 180 degrees, and 270 degrees, and may be different from one another.

In addition, the first reception pixel and the second reception pixel may be adjacent to each other.

In addition, the processor may interpolate information on the third phase time point in the first reception pixel by the information obtained by a pixel adjacent to the first reception pixel at the third phase time point.

The information on the third phase time point may include the information on the amount of charge for light received at the third phase time point.

In addition, the processor can increase the resolution by applying a super resolution technique.

In addition, the receiver includes a first block and a second block obtained by partitioning the reception pixels, wherein the processor may obtain the depth information by using both the light received through the first block and the light received through the second block.

In addition, two pixels included in the first block and one of the two pixels included in the second block may be overlapped.

A method for obtaining depth information according to a second aspect may comprise the steps of: outputting light to an object; receiving light at a first phase time point of a first period using a first reception pixel, and receiving light at a third phase time point of a first period using a second reception pixel; receiving light at a second phase time point of a second period using a first reception pixel, and receiving light at a fourth phase time point of a second period using a second reception pixel; and obtaining a depth image of the object using the information obtained during the first period and the second period.

In addition, the first phase time point to fourth phase time point correspond to any one of 0 degree, 90 degrees, 180 degrees and 270 degrees, and may be different from one another.

In addition, the first reception pixel and the second reception pixel may be adjacent to each other.

In addition, it may further include a step of interpolating the depth information obtained by the light obtained by the first reception pixel during the first period, by using the light information obtained during the first period by one or more pixels diagonally adjacent to the first reception pixel.

A third aspect may provide a computer-readable recording medium in which a program for executing a method according to the second aspect on a computer is recorded.

Advantageous Effects

The present disclosure may provide a method for obtaining depth information and a camera module according to one or more embodiments. According to an embodiment, in a camera module capable of obtaining depth information, a method for obtaining a depth image of an object by using light obtained during a first period and a second period is disclosed.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected", "coupled", or "jointed" to another component, the component may be directly connected, coupled, or jointed to the other component, however, it should be understood that another element may be "connected", "coupled" or "jointed" between components. In addition, when described as being formed or arranged in "on (above)" or "below (under)" of each component, "on (above)" or "below (under)" means that it includes not only the case where the two components are directly in contact with, but also the case where one or more other components are formed or disposed between the two components. In addition, when expressed as "upper (upper)" or "lower (lower)", the meaning of not only an upward direction but also a downward direction based on one component may be included.

In addition, the numerical values described below may be interpreted as values within a reasonable range according to errors. For example, a number written as "1" can be interpreted as "1.01".

Hereinafter, embodiments of the present invention will be described in detail with reference to the drawings. Hereinafter, 'light' may be understood as a concept including 'optical signal', and 'signal' may be understood as a concept including 'optical signal', and may be used interchangeably.

Figure 1:
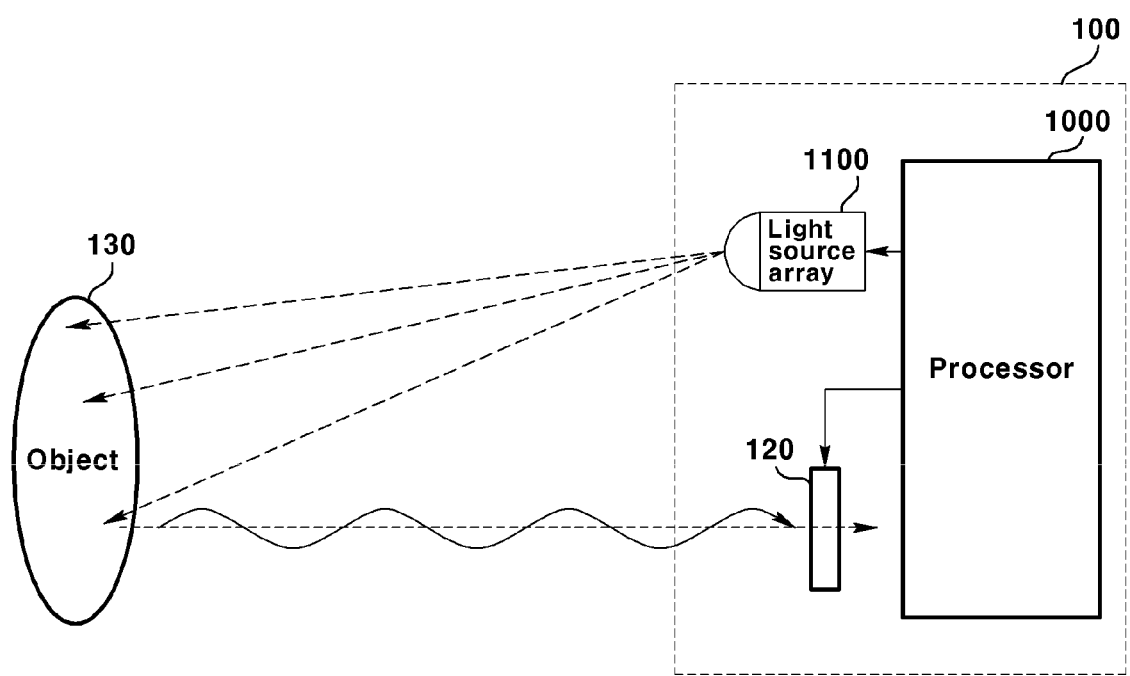
FIG. 1 is a block diagram illustrating a configuration and operation of a camera module according to an embodiment.

FIG. 1 is a block diagram illustrating a configuration and operation of a camera module according to an embodiment.

As illustrated in FIG. 1, the camera module 100 may include a light source 1100, a processor 1000, and a receiver 120.

However, it can be understood by a person skilled in the art that other general purpose components other than the components illustrated in FIG. 1 may be further included in a camera module 100. For example, the camera module 100 may further include a diffuser through which light outputted from the light source array passes, an optical modulator (not shown) included in the light source 1100, or a memory (not shown) connected to the processor 1000. The term "memory" can be broadly interpreted to include any electronic component capable of storing electronic information. The term memory may refer to various types of processor-readable media such as a random access memory (RAM), a read-only memory (ROM), a non-volatile random access memory (NVRAM), a programmable read-only memory (PROM), an electrically erasable PROM (EEPROM), flash memory, magnetic or optical data storage, registers, and the like. The memory is said to be in electronic communication with the processor if the processor 1000 can read information from the memory and/or write information to the memory. The memory integrated in the processor 1000 is in electronic communication with the processor.

In addition, memory may include at least one type of storage medium among a flash memory type, a hard disk type, a multimedia card micro type, a card type memory (e.g., SD or XD memory, etc.), a random access memory (RANI), a static random access memory (SRAM), a read-only memory (ROM), an electrically erasable programmable read-only memory (EEPROM), a programmable read-only memory (PROM), a magnetic memory, a magnetic disk, an optical disk.

Alternatively, according to another embodiment, it may be understood by a person skilled in the art that some of the components illustrated in FIG. 1 may be omitted.

The light source 1100 according to an embodiment may output light. The light outputted from the light source 1100 may be a wavelength within a preset range.

The light source 1100 may be, for example, a light emitting diode (LED) or laser diode (LD) capable of emitting light having an infrared wavelength, and light having a near-infrared (NIR) wavelength of about 850 nm, which is not visible to the human eye for safety, but the wavelength band and the type of light source array are not limited. For example, the wavelength of light outputted from the light source 1100 may be included in the visible region or the ultraviolet region.

The light source 1100 may output light, for example, by performing amplitude modulation or phase modulation according to the control signal received from the processor 1000. The light outputted from the light source 1100 to the object 130 according to the control signal of the processor 1000 may have a form of a periodic continuous function having a preset period. For example, the light may have a specially defined waveform such as a sine wave, a ramp wave, a square wave, or a pulse wave, but may have a general shape that is not defined.

The receiver 120 may receive light reflected from an object 130. The camera module 100 may obtain various pieces of information through the received light received by the receiver 120.

A camera module 100 according to an embodiment may obtain information on an object 130 through the received light. For example, the processor 1000 may obtain information about the object such as the shape, size, color, depth of the object 130, and the like.

The receiver 120 may distinguish a received light obtained by reflecting the light outputted from the light source 1100 to an object 130 among various lights entering the receiver 120. For example, the receiver 120 may selectively obtain light in the range of 750 nm to 950 nm through filtering when the light source 1100 outputs light in the range of 750 nm to 950 nm. In addition, the receiver 120 may obtain accurate information about the object 130 by selectively obtaining received light corresponding to the light.

Since the camera module 100 according to an embodiment can extract depth information using the ToF function, it may be understood interchangeably with ToF camera module or ToF module in the present disclosure.

The light source 1100 may generate light to be outputted and irradiate the object 130 with it. In this case, the light source 1100 may generate and output light in the form of a pulse wave or a continuous wave. The continuous wave may be in the form of a sinusoid wave or a square wave. By generating light in the form of a pulse wave or a continuous wave, the camera module 100 may determine a phase difference between the light outputted from the light source 1100 and the light reflected from the object and then received by the camera module 100.

The light source 1100 may irradiate the generated light onto the object 130 during a preset exposure period. The exposure period may mean one frame period. In the case of generating a plurality of frames, a set exposure period may be repeated. For example, when the camera module 100 photographs an object at 20 FPS, the exposure period is ½0 second. In addition, when 100 frames are generated, the exposure period may be repeated 100 times.

The light source 1100 may generate a plurality of lights having different frequencies. The light source 1100 may sequentially and repeatedly generate a plurality of lights having different frequencies. Alternatively, the light source 1100 may simultaneously generate a plurality of lights having different frequencies.

The light source 1100 according to an embodiment may output light to an object 130 through output pixels. The light source 1100 may include a plurality of output pixels, and each of the plurality of output pixels may independently output light. For example, a plurality of output pixels can output light of different intensities, can output light of different frequencies, can output light of different phases, and output light having different delay times. Each of the plurality of output pixels may include a light emitting diode.

The receiver 120 according to an embodiment may receive light through reception pixels. The receiver 120 may receive a reflected light being obtained as the light outputted from the light source 1100 is reflected from the object 130. The receiver 120 may include reception pixels and each of the reception pixels may receive light independently of one another. For example, reception pixels may receive light at different timings and may receive light using different filtering methods.

The receiver 120 according to an embodiment may include a lens (not shown) and an image sensor. The lens may collect light reflected from the object 130 and transmit it to an image sensor (not shown). The image sensor may receive light and generate an electrical signal corresponding to the received light.

According to an embodiment, the light source 1100 may output light of a different frequency over time. For example, the light source 1100 may output light with a frequency $f_1$ during the first half of the exposure period, and output light with a frequency $f_2$ during the other half of the exposure period.

According to an embodiment, some of the plurality of light emitting diodes included in the light source 1100 may output light having a frequency $f_1$, and other light emitting diodes may output light having a frequency $f_2$.

In order to control a plurality of light emitting diodes included in the light source 1100, the light source 1100 may include a light modulator.

The light source 1100 may generate light. The light generated by the light source 1100 may be infrared rays having a wavelength of 770 to 3000 nm, or visible light having a wavelength of 380 to 770 nm. The light source 1100 may use light emitting diodes (LED), and may have a shape in which a plurality of light emitting diodes are arranged according to a predetermined pattern. The light source 1100 may include an organic light emitting diode (OLED) or a laser diode (LD). Alternatively, the light source 1100 may be a vertical cavity surface emitting laser (VCSEL). The VCSEL is one of laser diodes that converts electrical signals into light, and may use a wavelength of about 800 to 1000 nm, for example, about 850 nm or about 940 nm.

The light source 1100 may repeatedly blink (on/off) at predetermined time intervals and generate light in the form of a pulse wave or a continuous wave. The predetermined time interval may be the frequency of the light. Blinking of the light source 1100 may be controlled by an optical modulator.

The optical modulator may control blinking of the light source 1100 to control the light source array 1100 to generate light in the form of a continuous wave or a pulse wave. The optical modulator may control the light source 1100 to generate light in the form of a continuous wave or a pulse wave through frequency modulation or pulse modulation, or the like.

The processor 1000 according to an embodiment may obtain depth information on the object 130 by using a phase difference between the light outputted from the light source 1100 and the light received by the receiver 120. The receiver 120 may generate an electric signal corresponding to each reference signal by using a plurality of reference signals having different phase differences. The frequency of the reference signal may be determined equal to the frequency of light outputted from the light source 1100. Accordingly, when the light source 1100 generates light with a plurality of frequencies, the receiver 120 may generate an electric signal using a plurality of reference signals corresponding to each frequency. The electrical signal may include information on the amount of charge or the voltage corresponding to each reference signal.

The number of reference signals according to an embodiment may be four, $C_1$ to $C_4$. Each of the reference signals $C_1$ to $C_4$ may have the same frequency as the light outputted from the light source 1100, but may have a 90-degree phase difference from one another. One of the four reference signals $C_1$ may have the same phase as the light outputted from the light source 1100. The light obtained by being reflected from the object 130 may be delayed in phase by a distance from which the light outputted from the light source 1100 is reflected from the object 130 and returned. The receiver 120 may generate signals $Q_1$ to $Q_4$ for each reference signal by mixing the received light and each reference signal, respectively.

The receiver 120 may include an image sensor configured in a structure in which a plurality of pixels is arranged in the form of a grid. The image sensor may be a complementary metal oxide semiconductor (CMOS) image sensor, or may be a charge coupled device (CCD) image sensor. In addition, the image sensor may include a ToF sensor that receives infrared light reflected from an object and measures a distance using time or phase difference.

Specifically, the processor 1000 may calculate a phase difference between the output light and the input light using information on the amount of charge of the electric signal.

As described above, four electrical signals may be generated for each frequency of light outputted from the light source 1100. Accordingly, the processor 1000 may determine a phase difference $t_d$ between the light outputted from the light source 1100 and the light received by the receiver 120 by using Equation 1 below.

$$t_d = \arctan\tan\left(\frac{Q_3 - Q_4}{Q_1 - Q_2}\right) \qquad \text{[Equation 1]}$$

Here, $Q_1$ to $Q_4$ may be a charge amount of each of the four electric signals. $Q_1$ is the amount of the electric charge of the electric signal corresponding to the reference signal of the same phase as the light outputted from the light source 1100, $Q_2$ is the amount of the electric charge of the electric signal corresponding to the reference signal having a phase lagging 180 degrees behind the light outputted from the light source 1100, $Q_3$ is the amount of the electric charge of the electric signal corresponding to the reference signal having a phase lagging 90 degrees behind the light outputted from the light source 1100, and $Q_4$ may be the amount of the electric charge of the electric signal corresponding to the reference signal having a phase lagging 270 degrees behind the light outputted from the light source 1100.

Then, the processor 1000 may determine the distance between the object 130 and the camera module 100 using the phase difference between the light outputted from the light source array 1100 and the light received by the receiver 120. In this case, the processor 1000 according to an embodiment may determine the distance d between the object 130 and the camera module 100 using Equation 2.

$$d = \frac{c}{2f} \frac{t_d}{2\pi} \qquad \text{[Equation 2]}$$

Here, c is the speed of light, and f may be the frequency of the output light.

According to an embodiment, a ToF IR image and a depth image may be obtained from the camera module 100.

The processor 1000 according to an embodiment may obtain depth information on an object 130 by using a difference the time point at which the light source 1100 outputs light and the time point at which the receiver 120 receives the light. The light source 1100 may obtain depth information by outputting light such as a laser or infrared light toward the object 130, receiving reflected and returned light, and calculating a time difference.

Figure 2:
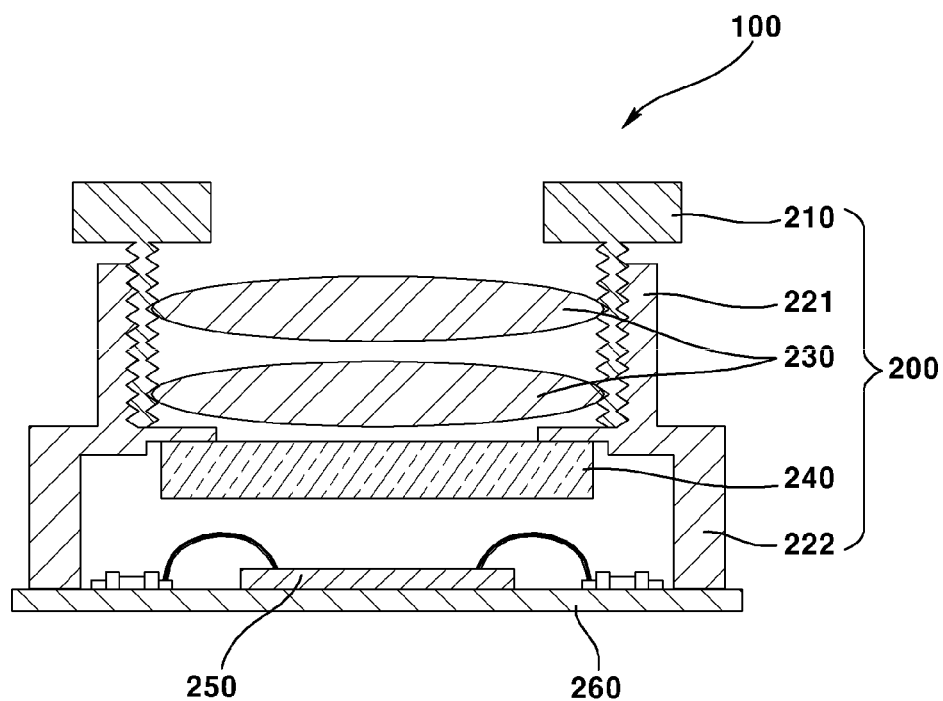
FIG. 2 is a cross-sectional view of a camera module according to an embodiment.

FIG. 2 is a cross-sectional view of a camera module 100 according to an embodiment.

Referring to FIG. 2, the camera module 100 includes a lens assembly 200, an image sensor 250, and a printed circuit board 260. The processor 1000 of FIG. 1 and the like may be implemented within the printed circuit board 260. Although not illustrated, the light source 1100 of FIG. 1 is disposed on a side surface of the image sensor 250 on the printed circuit board 260 or it may be disposed outside the camera module 100, for example, on a side surface of the camera module 100, but is not limited thereto.

The lens assembly 200 may include a lens 230, a lens barrel 210, lens holders 221 and 222, and an IR filter 240.

The lens 230 may be composed of a plurality of pieces, or may be composed of one piece. When the lens 230 is formed of a plurality of pieces, each of the lenses may be aligned with respect to the central axis to form an optical system. Here, the central axis may be the same as the optical axis of the optical system.

The lens barrel 210 is coupled to the lens holders 221 and 222, and a space for accommodating lenses may be provided therein. The lens barrel 210 may be rotationally coupled with one or a plurality of lenses, but this is exemplary, and it may be coupled in other ways, such as a method using an adhesive (for example, an adhesive resin such as epoxy).

The lens holders 221 and 222 may be coupled to the lens barrel 210 to support the lens barrel 210, and may be coupled to the printed circuit board 260 on which the image sensor 250 is mounted. A space in which the IR filter 240 can be attached may be formed under the lens barrel 210 by the lens holders 221 and 222. A spiral pattern may be formed on an inner circumferential surface of the lens holders 221 and 222, and similarly, the lens barrel 210 having a spiral pattern formed on an outer circumferential surface may be coupled by rotation. However, this is exemplary, and the lens holders 221 and 222 and the lens barrel 210 may be coupled through an adhesive, or the lens holders 221 and 222 and the lens barrel 210 may be integrally formed.

The lens holders 221 and 222 may be divided into an upper holder 221 coupled to the lens barrel 210 and a lower holder 222 coupled to the printed circuit board 260 on which the image sensor 250 is mounted, The upper holder 221 and the lower holder 222 may be integrally formed, formed in a structure separated from each other, and then fastened or combined, or may have a structure separated from each other and spaced apart from each other. In this case, the diameter of the upper holder 221 may be formed to be smaller than the diameter of the lower holder 222, but is not limited thereto.

The above example is only an embodiment, and the lens 230 may be configured with another structure capable of collimating light incident on the camera module 100 and delivering it to the image sensor 250.

The image sensor 250 may generate an electrical signal by using the light collimated through the lens 230.

The image sensor 250 may detect input light in synchronization with the blinking period of the light source array 1100. Specifically, the image sensor 250 may detect the light outputted from the light source array 1100 at in-phase and out-phase, respectively. That is, the image sensor 250 may repeatedly perform a step of absorbing light when the light source array 1100 is turned on and a step of absorbing light when the light source array 1100 is turned off.

The image sensor 250 may generate an electric signal corresponding to each reference signal by using a plurality of reference signals having different phase differences. The frequency of the reference signal may be determined equal to the frequency of light outputted from the light source 1100. Therefore, when the light source 1100 generates light with a plurality of frequencies, the image sensor 250 may generate an electric signal using a plurality of reference signals corresponding to each frequency. The electrical signal may include information on an amount of charge or voltage corresponding to each reference signal.

Figure 3:
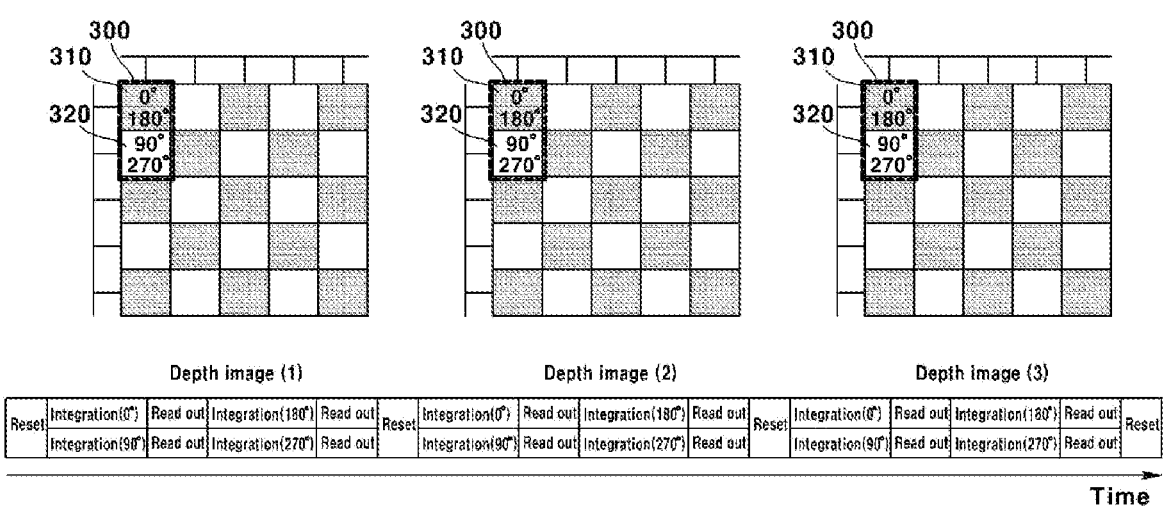
FIG. 3 illustrates an example in which a camera module according to an embodiment obtains a depth image of an object by using light obtained by a first pixel and a second pixel during a first period and a second period.

FIG. 3 illustrates an example in which a camera module 100 according to an embodiment obtains a depth image of an object by using light obtained by a first pixel 310 and a second pixel 320 during a first period and a second period. The first pixel 310 and the second pixel 320 may be reception pixels.

Referring to FIG. 3, the camera module may sequentially obtain a first depth image (1), a second depth image (2), and a third depth image (3). Specifically, the camera module 100 obtains the first depth image (1) by obtaining a 0-degree phase image, a 90-degree phase image, a 180-degree phase image, and a 270-degree phase image in the first first period and the second period, obtains the first depth image (2) by obtaining a 0-degree phase image, a 90-degree phase image, a 180-degree phase image, and a 270-degree phase image in the second first period and the second period, and may obtain the third depth image (3) by obtaining a 0-degree phase image, a 90-degree phase image, a 180-degree phase image, and a 270-degree phase image in the third first period and the second period, Specifically, the first pixel 310 included in a block 300 obtains a 0-degree phase image during a first period, and may obtain a 180-degree phase image during a second period. The second pixel 320 included in the block 300 obtains a 90-degree phase image during the first period, and may obtain a 270-degree phase image during the second period. However, it is not limited to the embodiment disclosed in FIG. 3, and which phase image is obtained by the first pixel 310 or the second pixel 320 in the first period or the second period may be determined according to a predetermined setting.

Since the intensity of a signal received once from the time of opening to the time of closing of the pixel is weak, the camera module 100 according to an embodiment may repeat the same process several times to obtain a depth image. For example, the block 300 may repeat a process of obtaining a phase image several times, for example, 100 or more times to obtain a depth image through integration or accumulation of the signal.

Referring to FIG. 3, a different phase signal may be applied for each pixel included in the block 300 during each period T. For example, the block 300 may include a first pixel 310 and a second pixel 320, and a 0-degree phase signal is applied to the first pixel 310 during a first period, and a 180-degree phase signal may be applied during the second period. A 90-degree phase signal may be applied to the second pixel 320 included in the block 300 during the first period, and a 270-degree phase signal may be applied during the second period, but is not limited thereto.

Since the strength of the signal received by each pixel during one period T is weak, the same process may be repeated several times. The camera module 100 may integrate or accumulate signals by repeating a period T in which a phase signal different for each pixel is applied several times, for example, 100 or more times.

The camera module 100 reads out information on 0-degree phase from the first pixel 310 in a first period and may read out information on 90-degree phase from the second pixel 320. In addition, the camera module 100 reads out information on 180-degree phase from the first pixel 310 in the second period and may read out information on 270-degree phase from the second pixel 320. And, the first depth image (1) can be obtained using information on 0-degree phase and information on 180-degree phase obtained from the first pixel 310, and information on 90-degree phase and information on 270-degree phase obtained from the second pixel 320.

In this way, a different phase signal is applied for each pixel included in one block 30 during each period T, and when a depth image is extracted using information on each phase obtained from each pixel, the time required for obtaining a depth image can be reduced.

During each period T, a different phase signal may be applied to the neighboring pixels, and during each period T, at least a portion of at least two of the section where a 0-degree phase signal or a 180-degree phase signal is applied to the first pixel and the section where a 90-degree phase signal or a 270-degree phase signal is applied to the second pixel may be overlapped with each other. Accordingly, the time required to obtain one depth image can be reduced compared to the case in which the section where the 0-degree phase signal is applied, the section where the 90-degree phase signal is applied, the section where the 180-degree phase signal is applied, and the section where the 270-degree phase signal is applied are not overlapped with one another.

Figure 4:
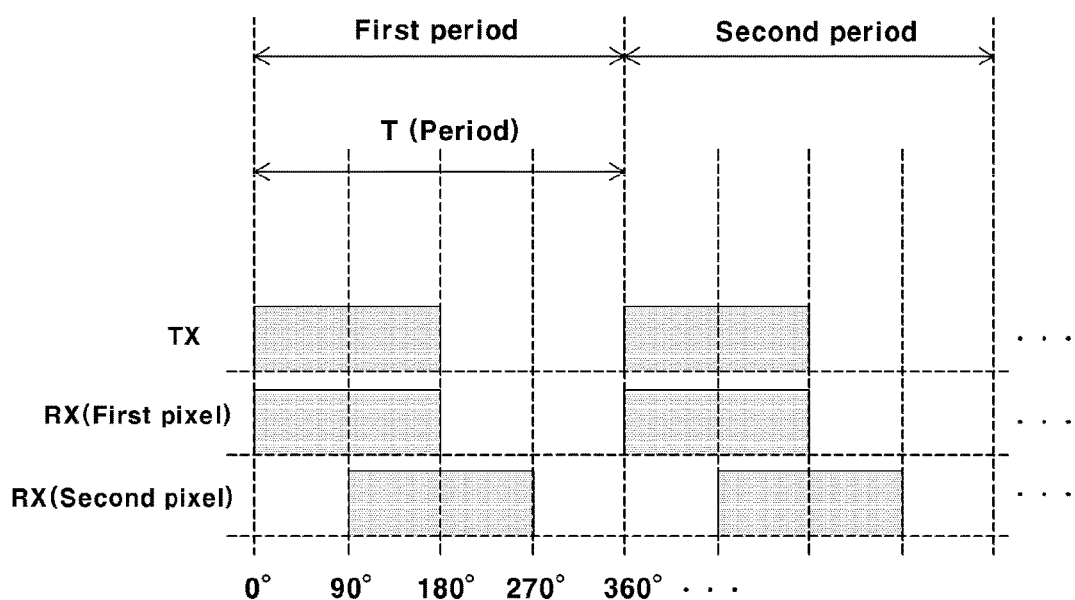
FIG. 4 is a timing diagram illustrating the operation of the camera module of FIG. 3 over time.

FIG. 4 is a timing diagram illustrating the operation of the camera module of FIG. 3 over time. The first pixel 310 and the second pixel 320 may be reception pixels.

The first pixel 310 receives light at a first phase time point of a first period and a second phase time point of a second period, respectively, and the second pixel 320 may receive light at a third phase time point of the first period and a fourth phase time point of the second period, respectively.

Referring to FIG. 4, since the first pixel 310 receives light being delayed by 0 degree in the first period the first pixel 310 may receive a 0-degree phase signal.

Since the second pixel 320 receives light being delayed by 90 degree in the first period 90 degree in the first period the second pixel 320 may receive a 90-degree phase signal.

Since the first pixel 310 receives light being delayed by 180 degrees in the second period the first pixel 310 may receive a 180-degree phase signal.

In the second period, since the second pixel 320 receives light being delayed by 270 degrees, the second pixel 320 may receive a 270-degree phase signal.

However, it is not limited to the embodiment disclosed in FIG. 4, and the first phase time point to the fourth phase time point may correspond to any one of 0 degree, 90 degrees, 180 degrees, and 270 degrees, and may be any combination different from each other.

The first pixel 310 and the second pixel 320 may be adjacent to each other. As illustrated in FIG. 4, the first pixel 310 and the second pixel 320 may be vertically adjacent to each other, but are not limited thereto. For example, the first pixel 310 and the second pixel 320 may be horizontally adjacent. Alternatively, the first pixel 310 and the second pixel 320 may be adjacent to each other diagonally.

Figure 5:
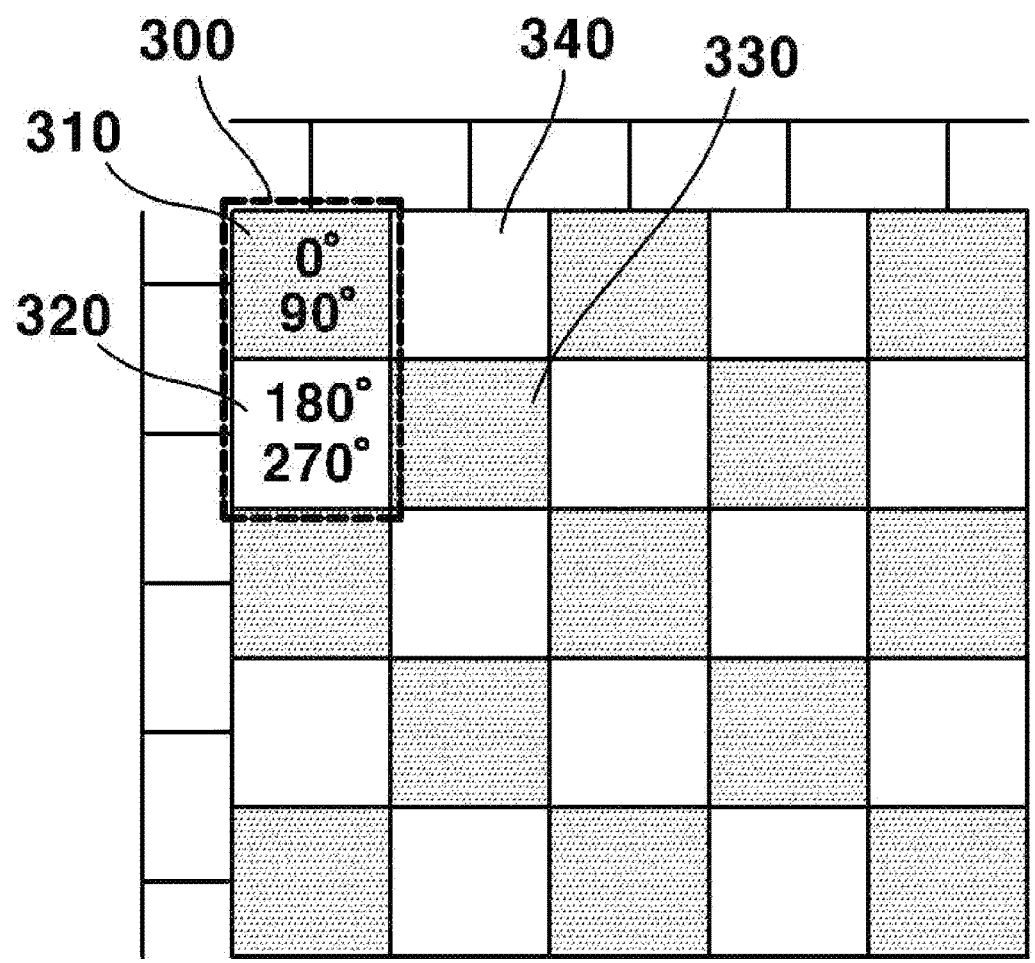
FIG. 5 is a diagram showing an example according to an embodiment in which a 0-degree phase signal is applied to the first pixel during the first period, a 180-degree phase signal is applied to the second pixel, and a 90-degree phase signal is applied to the first pixel during a second period, and a 270-degree phase signal is applied to the second pixel.

FIG. 5 is a diagram showing an example according to an embodiment in which a 0-degree phase signal is applied to the first pixel 310 during the first period, a 180-degree phase signal is applied to the second pixel 320, and a 90-degree phase signal is applied to the first pixel 310 during a second period, and a 270-degree phase signal is applied to the second pixel 320. The first pixel 310, the second pixel 320, the third pixel 330, and the fourth pixel 340 may be reception pixels.

Specifically, the first pixel 310 included in the block 300 obtains a 0-degree phase image during a first period, and may obtain a 90-degree phase image during a second period. The second pixel 320 included in the block 300 obtains a 180-degree phase image during the first period, and may obtain a 270-degree phase image during the second period. However, it is not limited to the embodiment disclosed in FIG. 5, and a phase image obtained by the first pixel 310 or the second pixel 320 in the first period or the second period may be determined according to a predetermined setting.

Since the intensity of a signal received once from the time of opening to the time of closing of the pixel is weak, the camera module 100 according to an embodiment may repeat the same process several times to obtain a depth image. For example, the block 300 may repeat a process of obtaining phase image several times, for example, 100 or more times to obtain a depth image through integration or accumulation of the signal.

The third pixel 330 corresponds to the first pixel 310, and the fourth pixel 340 may correspond to the second pixel 320. For example, the third pixel 330 obtains a 0-degree phase image during a first period, like the first pixel 310, and may obtain a 90-degree phase image during a second period. In addition, in this case, the fourth pixel 340 obtains a 180-degree phase image during the first period, like the second pixel 320, and may obtain a 270-degree phase image during the second period.

Figure 6:
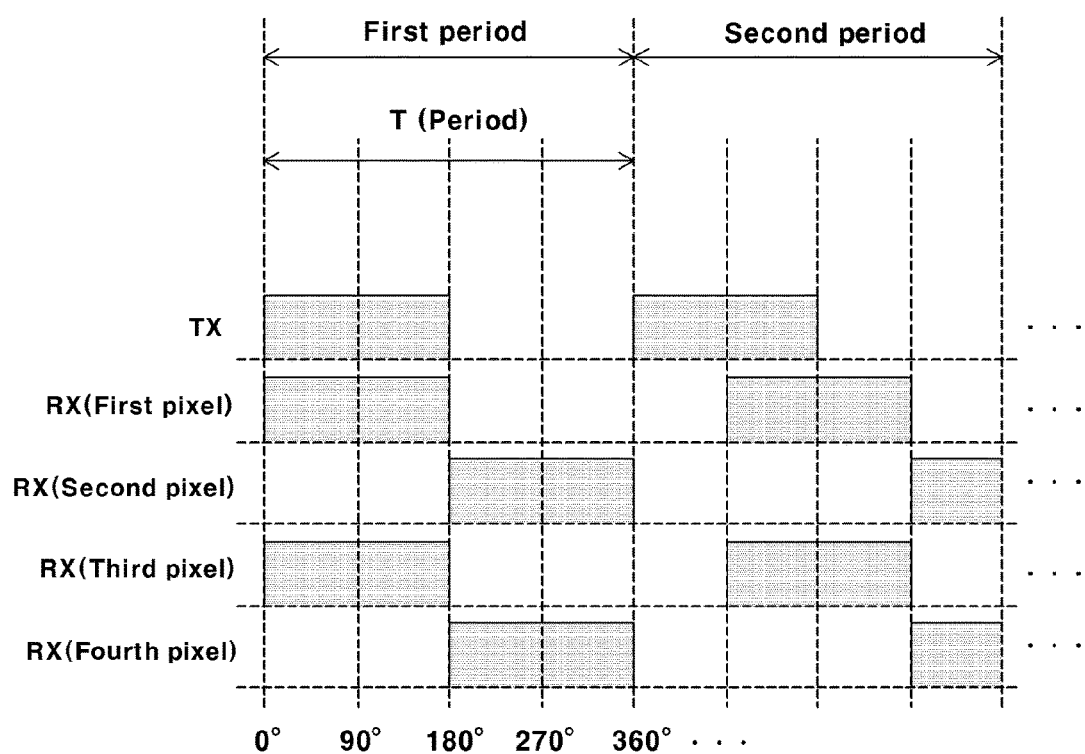
FIG. 6 is a timing diagram illustrating an operation of the camera module of FIG. 5 over time.

FIG. 6 is a timing diagram illustrating an operation of the camera module 100 of FIG. 5 over time.

Referring to FIG. 6, since the first pixel 310 receives light delayed by 0 degree in the first period, the first pixel 310 may receive a 0-degree phase signal.

In the first period, since the second pixel 320 receives light delayed by 180 degrees, the second pixel 320 may receive a 180-degree phase signal.

In the first period, since the third pixel 330 receives light delayed by 0 degree, the third pixel 330 may receive a 0-degree phase signal.

In the first period, since the fourth pixel 340 receives light delayed by 180 degree, the fourth pixel 340 may receive a 180-degree phase signal.

In the second period, since the first pixel 310 receives light delayed by 90 degrees, the first pixel 310 may receive a 90-degree phase signal.

In the second period, since the second pixel 320 receives light delayed by 270 degrees, the second pixel 320 may receive a 270-degree phase signal.

In the second period, since the third pixel 330 receives light delayed by 90 degrees, the third pixel 330 may receive a 90-degree phase signal.

In the second period, since the fourth pixel 340 receives light delayed by 270 degrees, the fourth pixel 340 may receive a 270-degree phase signal.

Figure 7:
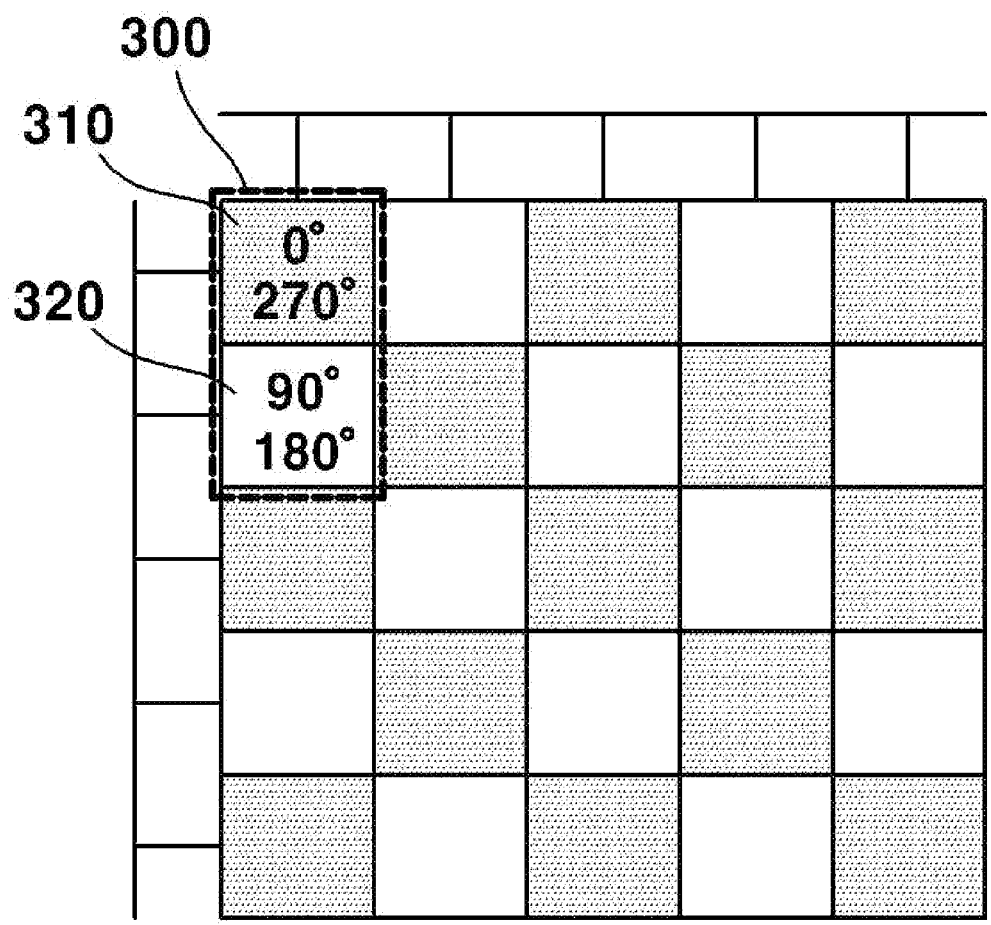
FIG. 7 is a diagram showing an example according to an embodiment, in which a 0-degree phase signal is applied to the first pixel during the first period, a 90-degree phase signal is applied to the second pixel, a 270-degree phase signal is applied to the first pixel during the second period, and a 180-degree phase signal is applied to the second pixel.

FIG. 7 is a diagram showing an example according to an embodiment, in which a 0-degree phase signal is applied to a first pixel 310 during the first period, a 90-degree phase signal is applied to the second pixel 320, a 270-degree phase signal is applied to the first pixel 310 during the second period, and a 180-degree phase signal is applied to the second pixel 320.

Specifically, the first pixel 310 included in the block 300 obtains a 0-degree phase image during a first period, and may obtain a 270-degree phase image during a second period. The second pixel 320 included in the block 300 may obtain a 90-degree phase image during the first period, and obtain a 180-degree phase image during the second period. However, it is not limited to the embodiment disclosed in FIG. 5, and a phase image obtained by the first pixel 310 or the second pixel 320 in the first period or the second period may be determined according to a predetermined setting.

Since the intensity of a signal received once from the time of opening to the time of closing of the pixel is weak, the camera module 100 according to an embodiment may repeat the same process several times to obtain a depth image. For example, the block 300 may repeat a process of obtaining phase image several times, for example, 100 or more times to obtain a depth image through integration or accumulation of the signal.

Figure 8:
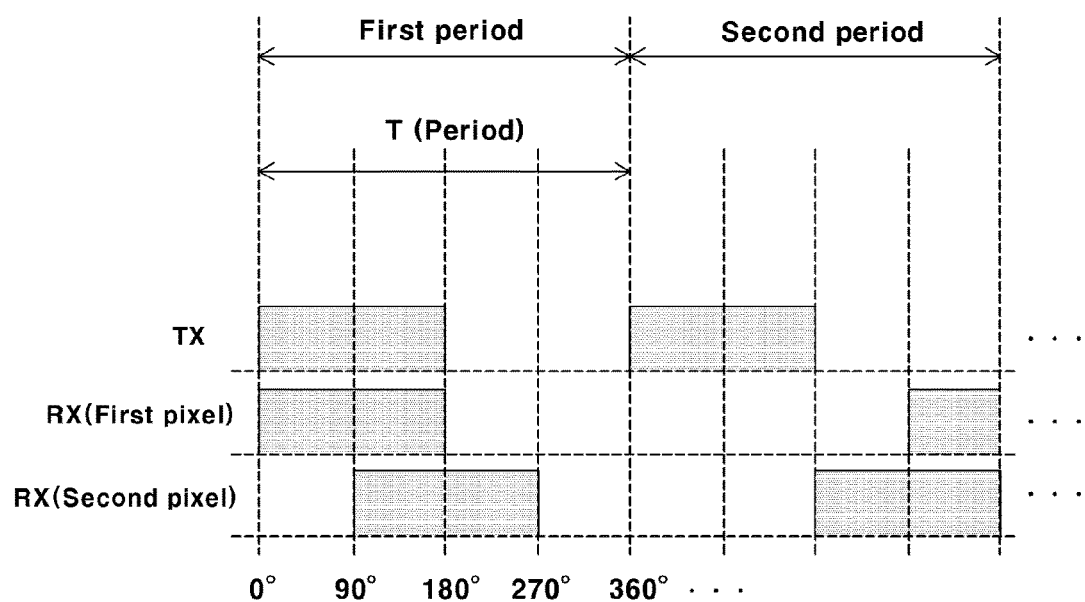
FIG. 8 is a timing diagram illustrating an operation of the camera module of FIG. 7 over time.

FIG. 8 is a timing diagram illustrating an operation of the camera module 100 of FIG. 7 over time.

Referring to FIG. 8, in a first period, since the first pixel 310 receives light delayed by 0 degree, the first pixel 310 may receive a 0-degree phase signal.

In the first period, since the second pixel 320 receives light delayed by 90 degree, the second pixel 320 may receive a 90-degree phase signal.

In the second period, since the first pixel 310 receives light being delayed by 270 degrees the first pixel 310 may receive a 270-degree phase signal.

In the second period, since the second pixel 320 receives light being delayed by 180 degrees the second pixel 320 may receive a 180-degree phase signal.

Figure 9:
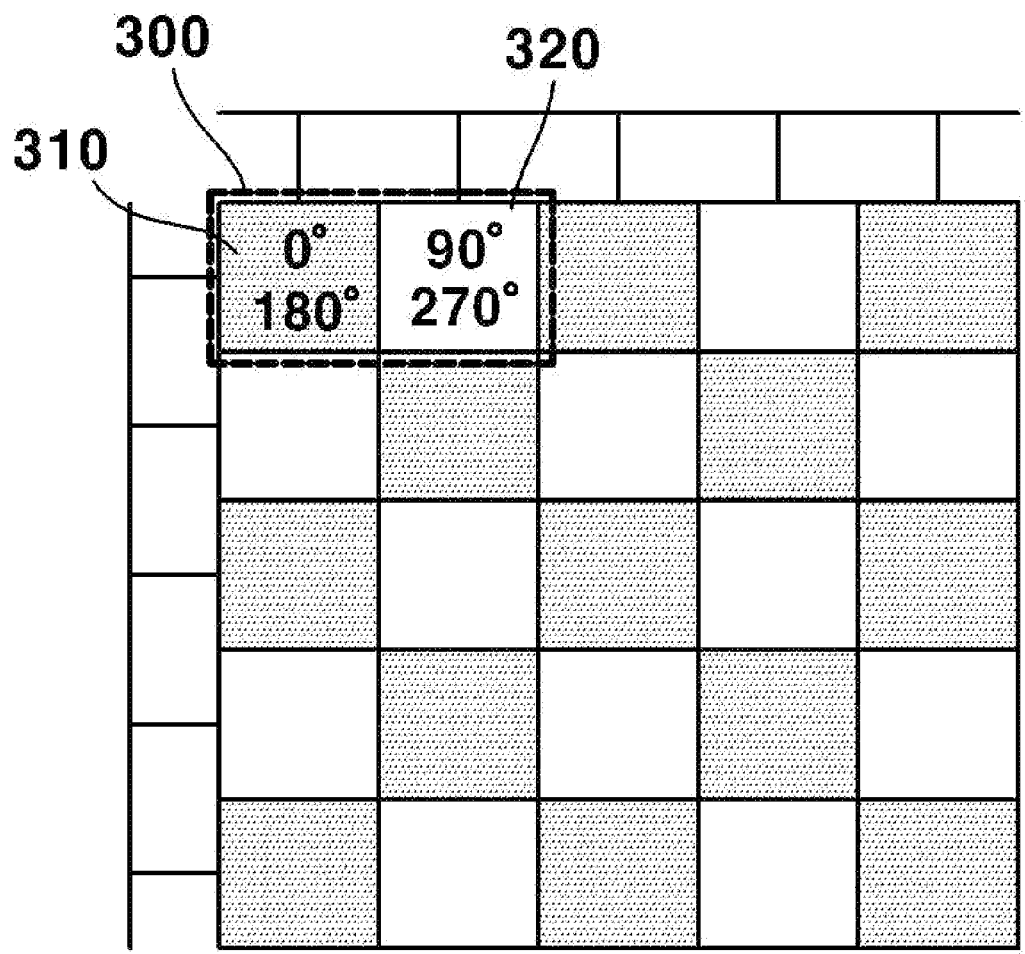
FIG. 9 is a diagram illustrating an example according to an embodiment in which a first pixel and a second pixel are horizontally adjacent.

FIG. 9 is a diagram illustrating an example according to an embodiment in which a first pixel 310 and a second pixel 320 are horizontally adjacent.

As illustrated in FIG. 9, relative positions of the first pixel 310 and the second pixel 320 may be variously determined. For detailed information about the phase signal received by the first pixel 310 and the second pixel, refer to FIG. 3.

Figure 10:
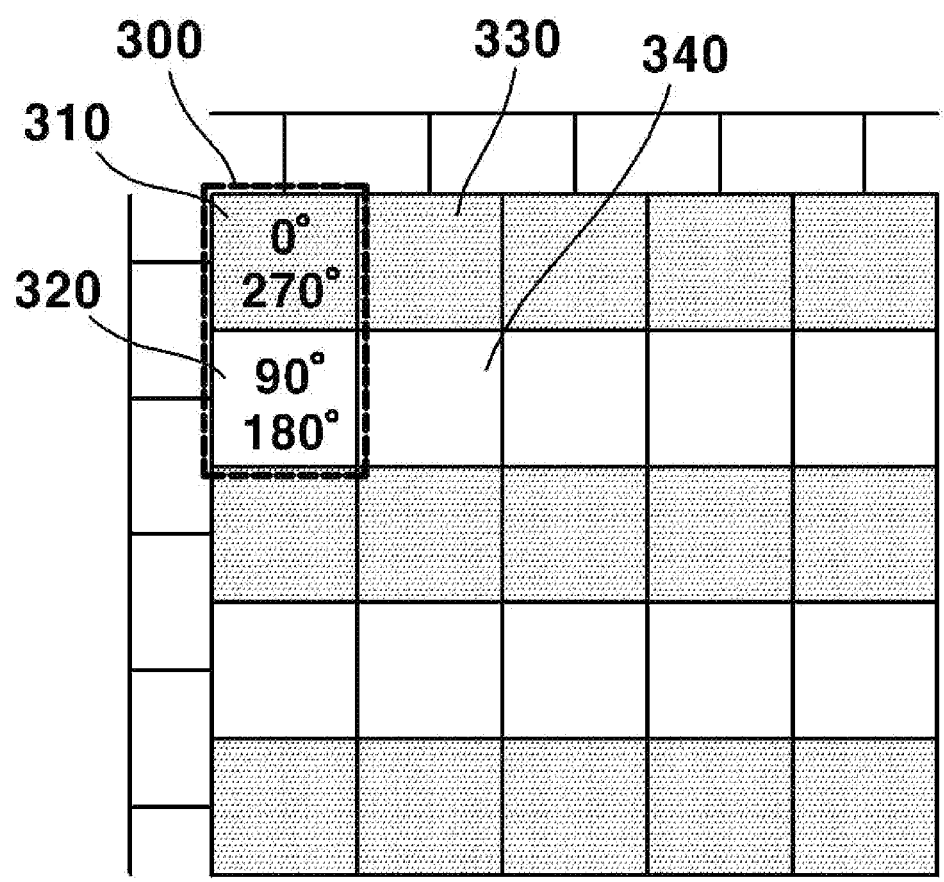
FIG. 10 is a diagram illustrating an operation example of a camera module according to an embodiment in which a first pixel and a third pixel are horizontally adjacent, and a second pixel and a fourth pixel are horizontally adjacent.

FIG. 10 is a diagram illustrating an operation example of a camera module according to an embodiment in which a first pixel 310 and third pixel 330 are horizontally adjacent, and a second pixel 320 and fourth pixel 340 are horizontally adjacent.

Referring to FIG. 10, unlike the case of FIG. 5, the first pixel 310 and the third pixel 330 are horizontally adjacent, and the second pixel 320 and the fourth pixel 340 are horizontally adjacent. That is, since pixels operating in the same manner are horizontally adjacent, the processor 1000 may control the pixels in units of lines. Since pixels of the same horizontal line operate in the same manner, the processor 1000 can control the pixels in units of lines, and accordingly, the complexity of the circuit can be reduced. In addition, the inclusion of two pixels 310 and 320 having different operation methods in the block 300 is the same as that of FIG. 5.

In FIG. 10, a case in which pixels of horizontal lines perform the same operation is illustrated, but the present invention is not limited thereto. For example, pixels in the receiver 120 may be set so that pixels of vertical lines perform the same operation.

Figure 11:
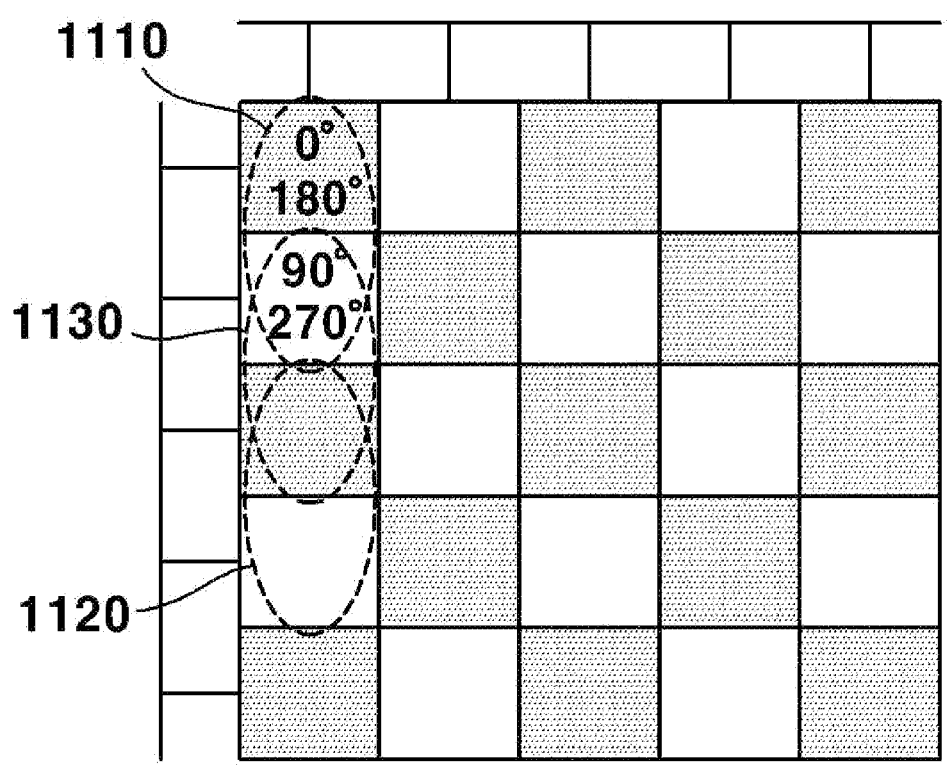
FIG. 11 is a diagram illustrating a method of increasing the resolution of an image by a camera module using a super resolution technique.

FIG. 11 is a diagram illustrating a method of increasing the resolution of an image by a camera module 100 using a super resolution technique.

Meanwhile, the camera module 100 may use a super resolution (SR) technique in order to increase the resolution of a depth image according to an embodiment. The SR technique can broadly refer to a method for obtaining a high resolution image from a plurality of low resolution images.

Specifically, the processor 1000 may obtain one depth information per block. If one depth information can be obtained per pixel, 25 depth information can be obtained from 25 pixels. However, if one depth information can be obtained per block, the obtainable information may be reduced. Since one depth information can be obtained by collecting information from two pixels, in principle, the obtainable information may be reduced to a half. For example, the processor 1000 may obtain two depth information from a first block 1110 and a second block 1120.

However, a case in which one depth information is obtained by collecting information obtained from two pixels may obtain more information than a case in which pixels being used are duplicately used. For example, the processor 1000 may further use the third block 1130 as well as the first block 1110 and the second block 1120. In addition, in some cases, one depth information may be obtained through two non-adjacent pixels.

In FIG. 11 according to an embodiment, a case in which the number of pixels included in a block is two and the number of pixels being overlapped between blocks being overlapped is one is described, but is not limited thereto.

Figure 12:
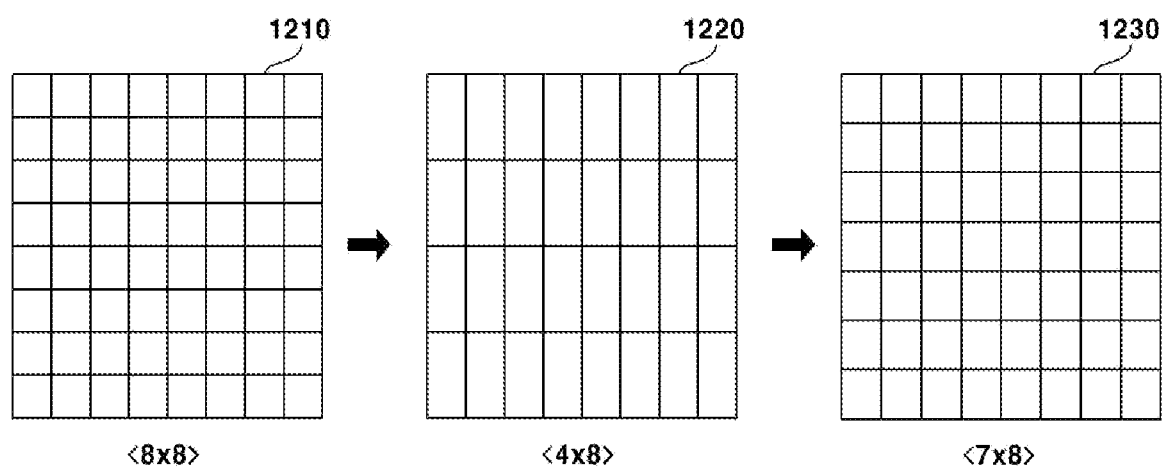
FIG. 12 is a diagram for describing an example according to an embodiment in which a resolution is increased according to a super resolution technique.

FIG. 12 is a diagram for describing an example according to an embodiment in which a resolution is increased according to a super resolution technique.

Referring to a first resolution diagram 1210, when obtaining information per pixel, a resolution corresponding to the number of pixels can be obtained. However, in the case of obtaining information per block, when one pixel is used only once, the resolution may decrease by the number of pixels included in the block. For example, the resolution of a second resolution diagram 1220 is reduced to one-half compared to the first resolution diagram 1210. However, when the above-described SR technique is used, the resolution can be substantially increased, and a resolution higher than the resolution expressed in a third resolution diagram 1230 can be implemented through an additional algorithm.

Figure 13:
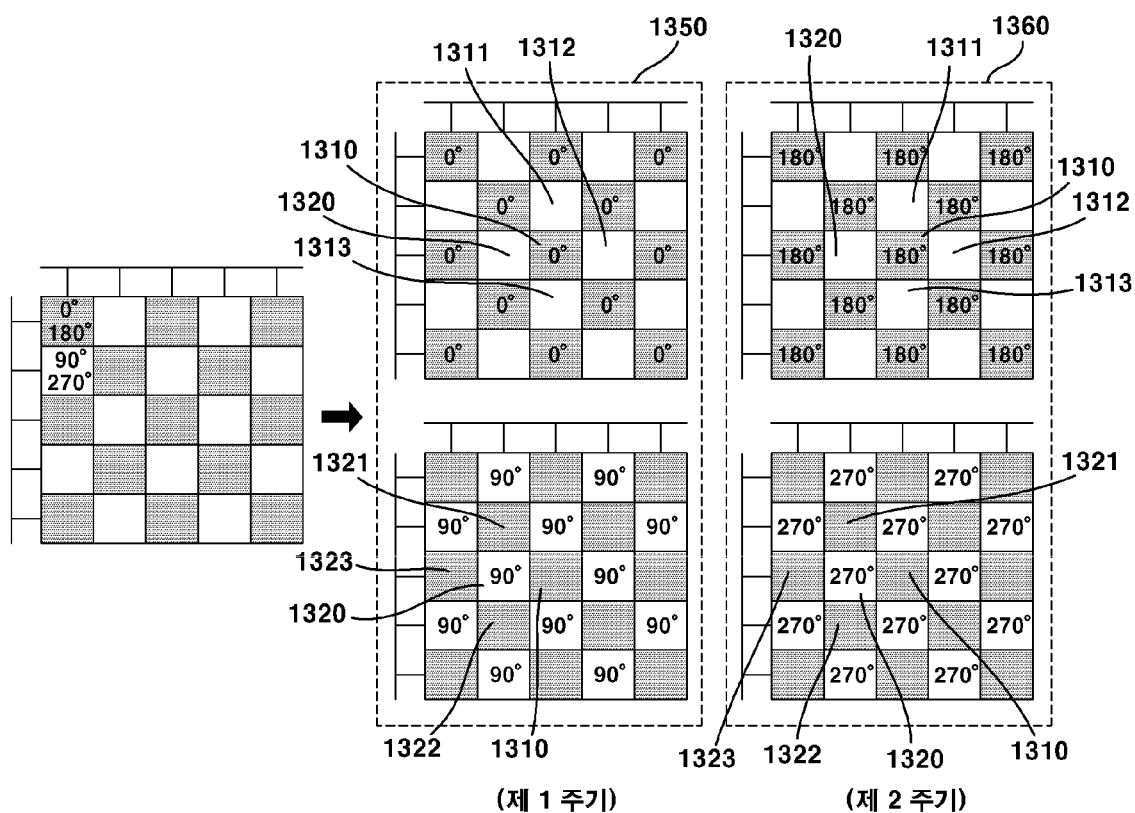
FIG. 13 is a diagram for describing an example of increasing the resolution by performing interpolation according to an embodiment.

FIG. 13 is a diagram for describing an example of increasing the resolution by performing interpolation according to an embodiment.

The phase of light received by the reception pixels during the first period is disclosed in a first period diagram 1350, and the phase of light received by the reception pixels during the second period is disclosed in a second periodic diagram 1360. A first pixel 1310 and a second pixel 1320 may be reception pixels.

In the first period 1350, the processor 1000 according to an embodiment may obtain a 90-degree phase signal (information on the 90-degree phase time point) at the first pixel 1310 by interpolating the 90-degree phase signal (information on the 90-degree phase time point) obtained by the pixels 1311, 1312, 1313, and 1320 adjacent to the first pixel 1310. In the first pixel 1310, only the 0-degree phase signal and the 180-degree phase signal can be obtained in the first and second periods, respectively, but the 90-degree phase signal is not obtained. However, the processor 1000 may obtain the 90-degree phase signal at the first pixel 1310 by interpolating the phase signal obtained by the adjacent pixels.

In the first period 1350, the processor 1000 according to an embodiment may obtain a 0-degree phase signal (information on the 0-degree phase time point) at the second pixel 1320 by interpolating the 0-degree phase signal (information on the 0-degree phase time point) obtained by the pixels 1321, 1322, 1123, and 1310 adjacent to the second pixel 1320. In the second pixel 1320, only the 90-degree phase signal and the 270-degree phase signal can be obtained in the first and second periods, respectively, but the 0-degree phase signal is not obtained. However, the processor 1000 may obtain the 0-degree phase signal in the second pixel 1320 by interpolating the phase signal obtained by the adjacent pixels.

In the second period 1360, the processor 1000 according to an embodiment may obtain a 270-degree phase signal (information on the 270-degree phase time point) at the first pixel 1310 by interpolating the 270-degree phase signal (information on the 270-degree phase time point) obtained by the pixels 1311, 1312, 1313, and 1320 adjacent to the first pixel 1310. However, the processor 1000 may obtain the 270-degree phase signal at the first pixel 1310 by interpolating the phase signal obtained by the adjacent pixels. In the first pixel 1310, only the 0-degree phase signal and the 180-degree phase signal can be obtained in the first and second periods, respectively, but the 270-degree phase signal is not obtained. However, the processor 1000 may obtain the 270-degree phase signal in the first pixel 1310 by interpolating the phase signal obtained by the adjacent pixels.

In the second period 1360, the processor 1000 according to an embodiment may obtain a 180-degree phase signal (information on the 180-degree phase time point) at the second period 1360 by interpolating the 180-degree phase signal (information on the 180-degree phase time point) obtained by the pixels 1321, 1322, 1123, and 1310 adjacent to the second pixel 1320. In the second pixel 1320, only the 90-degree phase signal and the 270-degree phase signal can be obtained in the first and second periods, respectively, but the 180-degree phase signal is not obtained. However, the processor 1000 may obtain the 180-degree phase signal at the second pixel 1320 by interpolating the phase signal obtained by the adjacent pixels.

Figure 14:
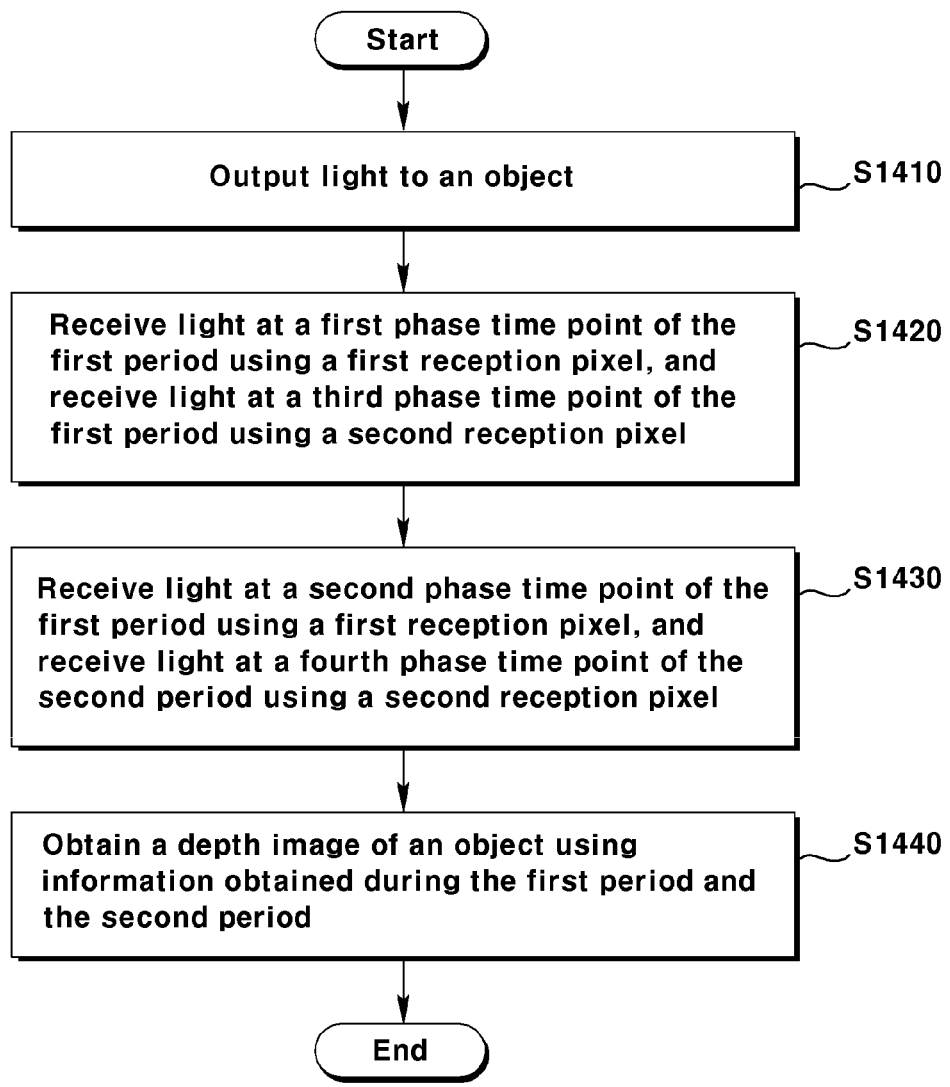
FIG. 14 is a flowchart illustrating a method for obtaining depth information on an object according to an embodiment.

FIG. 14 is a flowchart illustrating a method for obtaining depth information on an object according to an embodiment. FIG. 14 may be understood with reference to the contents of FIGS. 1 to 13 described above.

In step S1310, the camera module 100 according to an embodiment outputs light to an object through output pixels. According to an embodiment, each of the output pixels may correspond to each of the reception pixels.

In step S1320, the camera module 100 according to an embodiment receives light using a first reception pixel at a first phase time point of a first period and receives light using a second reception pixel at a third phase time point of the first period. For example, in a first period, a first pixel receives a 0-degree phase signal, and a second pixel may receive a 90-degree phase signal.

In step S1330, the camera module 100 according to an embodiment receives light using a first reception pixel at a second phase time point of a second period and receives light using a second reception pixel at a fourth phase time point of the second period. For example, in a second period, a first pixel receives a 180-degree phase signal, and a second pixel may receive a 270-degree phase signal. The first pixel and the second pixel may be a reception pixel.

However, it is not limited to the present embodiment and the first phase time point to the fourth phase time point may correspond to any one of 0 degree, 90 degrees, 180 degrees, and 270 degrees, and may be any combination different from each other.

In step S1340, the camera module 100 according to an embodiment obtains a depth image of an object by using the information obtained during the first period and the second period. The processor 1000 may obtain one depth image only with information obtained during two periods.

In addition, although not shown in FIG. 13, a step of interpolating information about a third phase time point in the first reception pixel by information obtained by a pixel adjacent to the first reception pixel at a third phase time point may be further included.

Meanwhile, the above-described method can be written as a program that can be executed on a computer, and can be implemented in a general-purpose digital computer that operates the program using a computer-readable recording medium. In addition, the structure of the data used in the above method can be recorded on a computer-readable recording medium through various means. The recording medium that can be read with the above described computer includes a storage medium such as a magnetic storage medium (e.g., ROM, RAM, USB, floppy disk, hard disk, etc.), and an optical reading medium (e.g., CD-ROM, DVD, etc.).

The embodiments of the present invention have been described above with reference to the accompanying drawings, but a person skilled in the art to which the present invention belongs may understand that the present invention can be implemented in other specific forms without changing the technical idea or essential features. Therefore, it should be understood that the embodiments described above are illustrative and non-limiting in all respects.

The invention claimed is:

1. A camera module comprising:
a light source configured to output light to an object;
a receiver configured to receive light reflected from the object through reception pixels, the reception pixels including a first reception pixel and a second reception pixel adjacent to the first reception pixel; and
a processor configured to:
turn on the first reception pixel at a first phase time point in a first period while the second reception pixel is turned off, and generate first information based on light received by the first reception pixel at the first phase time point in the first period,
turn on the second reception pixel at a second phase time point in the first period while the first reception pixel is turned off, and generate second information based on light received by the second reception pixel at the first phase time point in the first period,
turn on the first reception pixel at a third phase time point in a second period while the second reception pixel is turned off, and generate third information based on light received by the first reception pixel at the third phase time point in the second period,
turn on the second reception pixel at a fourth phase time point in the second period while the first reception pixel is turned off, and generate fourth information based on light received by the second reception pixel at the fourth phase time point in the second period, and
generate a depth image of the object based on the first, second, third and fourth information,
wherein the receiver includes a first block and a second block obtained by partitioning the reception pixels,
wherein the processor is further configured to generate the depth image of the object by using both light received through the first block and light received through the second block,
wherein one of two pixels included in the first block and one of two pixels included in the second block overlap, and
wherein the third phase time point for turning on the first reception pixel in the second period corresponds to a first delayed phase shift relative to the first phase time point in the first period, the fourth phase time point for turning on the second reception pixel in the second period corresponds to a second delayed phase shift relative to the second phase time point in the first period, and the first delayed phase shift for turning on the first reception pixel in the second period is greater than the second delayed phase shift for turning on the second reception pixel in the second period.

2. The camera module according to claim 1, wherein the first phase time point to the fourth phase time point correspond to any one of 0 degree, 90 degrees, 180 degrees, and 270 degrees, and are different from each other.

3. The camera module according to claim 1, wherein the processor interpolates information on the second phase time point at the first reception pixel by the information obtained at a pixel adjacent to the first reception pixel on the second phase time point.

4. The camera module according to claim 3, wherein the information on the second phase time point includes information on an amount of charge for light received at the third phase time point.

5. The camera module according to claim 1, wherein the processor increases resolution by applying a super resolution technique.

6. The camera module according to claim 1, wherein the light source outputs light by performing amplitude modulation or phase modulation according to a control signal received from the processor.

7. The camera module according to claim 1, wherein the light outputted from the light source has a form of a periodic continuous function having a preset period.

8. The camera module according to claim 1, wherein the light source includes output pixels, and each of the output pixels output light independently.

9. The camera module according to claim 8, wherein the output pixels output light of different intensities, different frequencies, different phases, and different delay times from each other.

10. A camera module comprising:
a light source configured to output light to an object;

an image sensor configured to receive light reflected from the object through reception pixels and disposed on the printed circuit board;

a printed circuit board including a processor; and a lens assembly including lens and coupled to the printed circuit board, wherein the processor is configured to:

turn on the first reception pixel at a first phase time point in a first period while the second reception pixel is turned off, and generate first information based on light received by the first reception pixel at the first phase time point in the first period, turn on the second reception pixel at a second phase time point in the first period while the first reception pixel is turned off, and generate second information based on light received by the second reception pixel at the first phase time point in the first period, turn on the first reception pixel at a third phase time point in a second period while the second reception pixel is turned off, and generate third information based on light received by the first reception pixel at the third phase time point in the second period, turn on the second reception pixel at a fourth phase time point in the second period while the first reception pixel is turned off, and generate fourth information based on light received by the second reception pixel at the fourth phase time point in the second period, and generate a depth image of the object based on the first, second, third and fourth information, wherein the image sensor includes a first block and a second block obtained by partitioning the reception pixels, wherein the processor is further configured to generate the depth image of the object by using both light received through the first block and light received through the second block, and wherein one of two pixels included in the first block and one of two pixels included in the second block overlap, and wherein the third phase time point for turning on the first reception pixel in the second period corresponds to a first delayed phase shift relative to the first phase time point in the first period, the fourth phase time point for turning on the second reception pixel in the second period corresponds to a second delayed phase shift relative to the second phase time point in the first period, and the first delayed phase shift for turning on the first reception pixel in the second period is greater than the second delayed phase shift for turning on the second reception pixel in the second period.

11. The camera module according to claim 10, wherein the first phase time point to the fourth phase time point correspond to any one of 0 degree, 90 degrees, 180 degrees, and 270 degrees, and different from each other.

12. The camera module according to claim 10, wherein the processor interpolates information on the second phase time point at the first reception pixel by the information obtained at a pixel adjacent to the first reception pixel on the second phase time point.

13. A method of controlling a camera device, the method comprising:

outputting, via a light source in the camera device, light to an object;

turning on, via a processor in the camera device, a first reception pixel at a first phase time point in a first period while a second reception pixel adjacent to the first reception pixel is turned off, and generating first information based on light received by the first reception pixel at the first phase time point in the first period;

turning on, via the processor, the second reception pixel at a second phase time point in the first period while the first reception pixel is turned off, and generating second information based on light received by the second reception pixel at the first phase time point in the first period;

turning on, via the processor, the first reception pixel at a third phase time point in a second period while the second reception pixel is turned off, and generating third information based on light received by the first reception pixel at the third phase time point in the second period;

turning on, via the processor, the second reception pixel at a fourth phase time point in the second period while the first reception pixel is turned off, and generating fourth information based on light received by the second reception pixel at the fourth phase time point in the second period; and generating a depth image of the object based on the first, second, third and fourth information, wherein the depth image is obtained by using both light received through a first block and light received through a second block, wherein the first block and the second block are obtained by partitioning the reception pixels, wherein one of two pixels included in the first block and one of two pixels included in the second block overlap, and wherein the third phase time point for turning on the first reception pixel in the second period corresponds to a first delayed phase shift relative to the first phase time point in the first period, the fourth phase time point for turning on the second reception pixel in the second period corresponds to a second delayed phase shift relative to the second phase time point in the first period, and the first delayed phase shift for turning on the first reception pixel in the second period is greater than the second delayed phase shift for turning on the second reception pixel in the second period.

14. The method according to claim 13, wherein the first phase time point to the fourth phase time point correspond to any one of 0 degree, 90 degrees, 180 degrees and 270 degrees, and are different from each other.

15. The method according to claim 13, further comprising:

interpolating information on the third phase time point at the first reception pixel by the information obtained at a pixel adjacent to the first reception pixel on the third phase time point.

16. The camera module according to claim 1, wherein the processor is configured to:

turn on a third reception pixel diagonally adjacent to the first reception pixel at the first phase time point in the first period while the second reception pixel is turned off, and generate fifth information based on light received by the third reception pixel at the first phase time point in the first period, turn on the third reception pixel at the third phase time point in the second period while the second reception pixel is turned off, and generate sixth information based on light received by the third reception pixel at the third phase time point in the second period, and generate the depth image of the object based on the first, second, third, fourth, fifth and sixth information.

17. The camera module according to claim 1, wherein the processor is further configured to:
output of the light by the light source to have a turn on period and a turn off period during the first period that is synchronized with a turn on period and a turn off period of the first reception pixel during the first period.

18. The camera module according to claim 10, wherein the processor is further configured to:
output of the light by the light source to have a turn on period and a turn off period during the first period that is synchronized with a turn on period and a turn off period of the first reception pixel during the first period.

19. The method according to claim 13, wherein the outputting of the light by the light source has a turn on period and a turn off period during the first period that is synchronized with a turn on period and a turn off period of the first reception pixel during the first period.

* * * * *